(12) United States Patent
Yokoyama

(10) Patent No.: US 7,688,501 B2
(45) Date of Patent: Mar. 30, 2010

(54) OPTICAL TRANSMISSION SYSTEM AND OPTICAL AMPLIFICATION METHOD USED IN THE SYSTEM

(75) Inventor: Ryu Yokoyama, Tokyo (JP)

(73) Assignee: NEC Corporation (JP)

( * ) Notice: Subject to any disclaimer, the term of this patent is extended or adjusted under 35 U.S.C. 154(b) by 203 days.

(21) Appl. No.: 10/633,927

(22) Filed: Aug. 4, 2003

(65) Prior Publication Data

US 2004/0027649 A1    Feb. 12, 2004

(30) Foreign Application Priority Data

Aug. 2, 2002    (JP)   ............... 2002-226150

(51) Int. Cl.
*H01S 3/00*    (2006.01)
(52) U.S. Cl. .................... 359/344; 359/341.3
(58) Field of Classification Search ................ 398/157; 359/344, 341.3
See application file for complete search history.

(56) References Cited

U.S. PATENT DOCUMENTS

| | | | |
|---|---|---|---|
| 5,883,736 | A | 3/1999 | Oshima et al. |
| 6,204,960 | B1 * | 3/2001 | Desurvire ............... 359/341.33 |
| 6,236,498 | B1 * | 5/2001 | Freeman et al. ........... 359/337.1 |
| 6,567,207 | B1 * | 5/2003 | Badr et al. .............. 359/341.32 |
| 6,636,345 | B2 * | 10/2003 | Hempstead ............ 359/341.32 |
| 6,809,858 | B2 * | 10/2004 | Badr et al. ............. 359/341.32 |
| 2001/0050802 | A1 * | 12/2001 | Namiki et al. ......... 359/337.11 |
| 2002/0067539 | A1 * | 6/2002 | Grubb et al. ............. 359/341.3 |
| 2002/0085268 | A1 * | 7/2002 | Zarris et al. .................. 359/334 |
| 2002/0109896 | A1 * | 8/2002 | Lauder et al. ................ 359/238 |

(Continued)

FOREIGN PATENT DOCUMENTS

EP    0 585 005 A1    8/1993

(Continued)

OTHER PUBLICATIONS

Search Report issued by European Patent Office in connection with corresponding application No. 03254850.5-1246 on Jul. 6, 2005.

(Continued)

*Primary Examiner*—Mark Hellner
(74) *Attorney, Agent, or Firm*—Ostrolenk Faber LLP

(57) ABSTRACT

At an optical transmission system that uses plural light sources for Raman amplification, even when a failure occurred in a pumping light source in one of the light sources for Raman amplification, the signal light output level and its wavelength characteristic are not deteriorated at the final stage, and the number of components in the system is not made to be large and the cost of the system is not made to be high. This optical transmission system is provided. At an optical transmission system using "n" light sources for Raman amplification, a first to "n–1"th light sources for Raman amplification do not provide spare pumping light sources, and an "n"th light source for Raman amplification provides the spare pumping light sources. When a pumping light source in one of the "n" light sources for Raman amplification had a failure, the spare pumping light source in the "n"th light source for Raman amplification corresponding to the failure occurred pumping light source is worked. With this, the signal light output level and its wavelength characteristic are recovered to a normal state before the failure occurred.

6 Claims, 7 Drawing Sheets

U.S. PATENT DOCUMENTS

2002/0118447 A1* 8/2002 Hempstead ............ 359/341.33
2002/0167719 A1* 11/2002 Pedersen et al. ......... 359/341.3
2003/0142924 A1* 7/2003 Ikeda et al. ................... 385/88

FOREIGN PATENT DOCUMENTS

| EP | 1 143 645 A2 | 10/2001 |
|---|---|---|
| JP | 5-268166 | 10/1993 |
| JP | 2001-230480 | 8/2001 |
| JP | 2001-249369 | 9/2001 |

OTHER PUBLICATIONS

Untranslated Japanese Office Action issued on Nov. 20, 2007 in connection with corresponding Japanese application No. 2002-226150.

English translation of Japanese Office Action issued in connection with 2002-226150 submitted in lieu of statement of relevancy of prior art teachings to the instant application.

*Flat Gain Profile in DRA-Cascased Systems with Fiber Repair and Pumping LD Failure*, Shimojoh, et al., *Proc. 27th Eur. Conf. On Opt. Comm.* (ECOC'01—Amsterdam) Tu.A.2.4., pp. 162-163.

Office Action issued by the Japanese Patent Office on Apr. 1, 2008 in connection with corresponding Japanese Patent Application No. 2002-226150.

Translation of the Office Action issued by the Japanese Patent Office on Apr. 1, 2008 in connection with corresponding Japanese Patent Application No. 2002-226150.

"Proceedings of the 2001 Communications Society Conference of IEICE" B-10-66 and B-10-62, Sep. 18-21, 2001, The University of Electro-Communications, Choufu Communications Society, The Institute of Electronics, Information and Communication Engineers.

* cited by examiner

F I G. 1
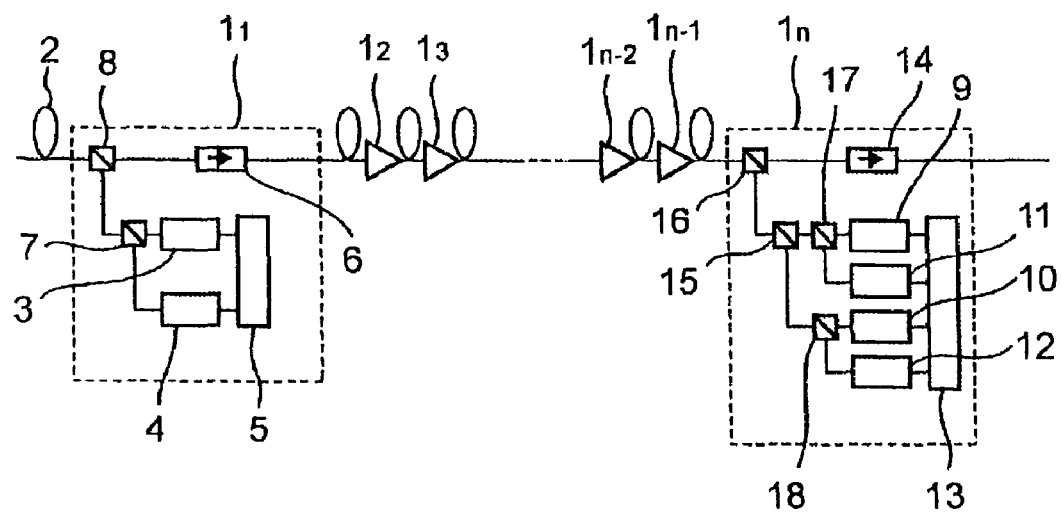

F I G. 2
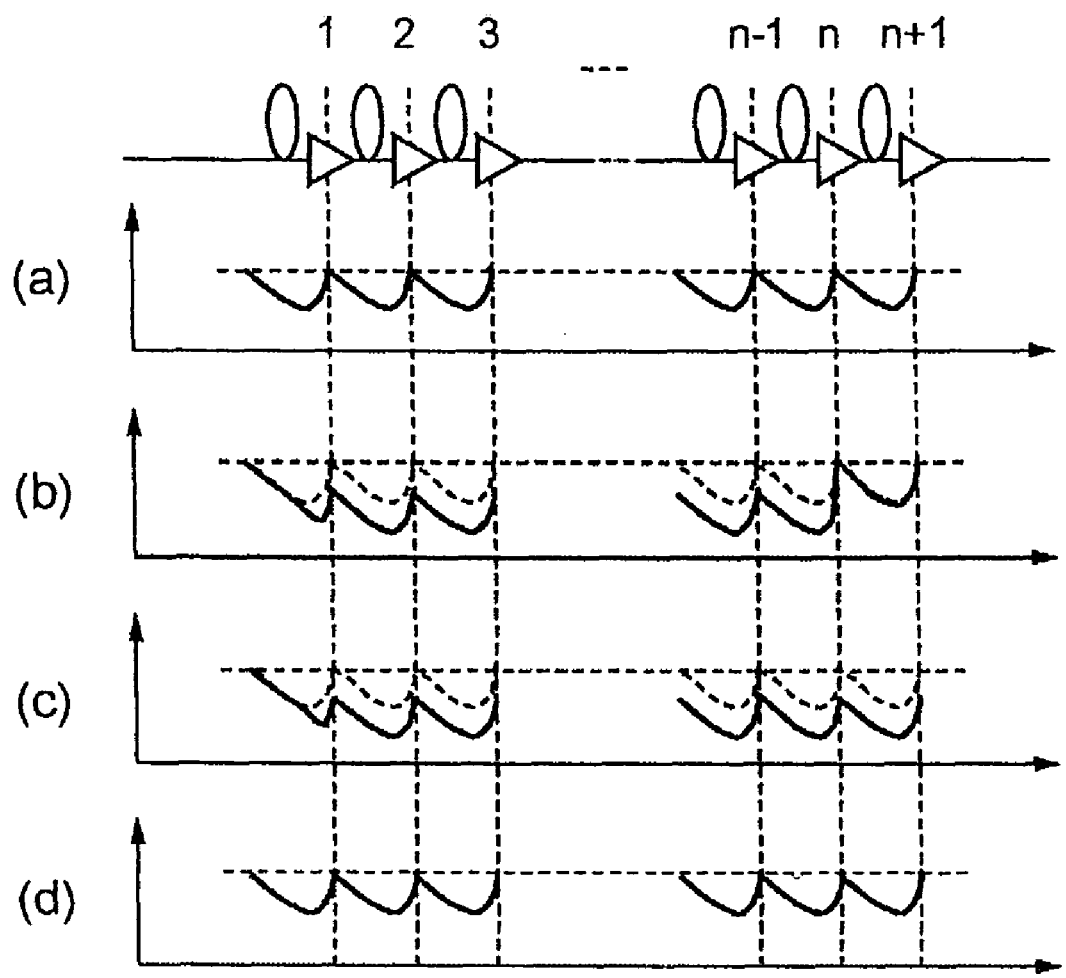

F I G. 3
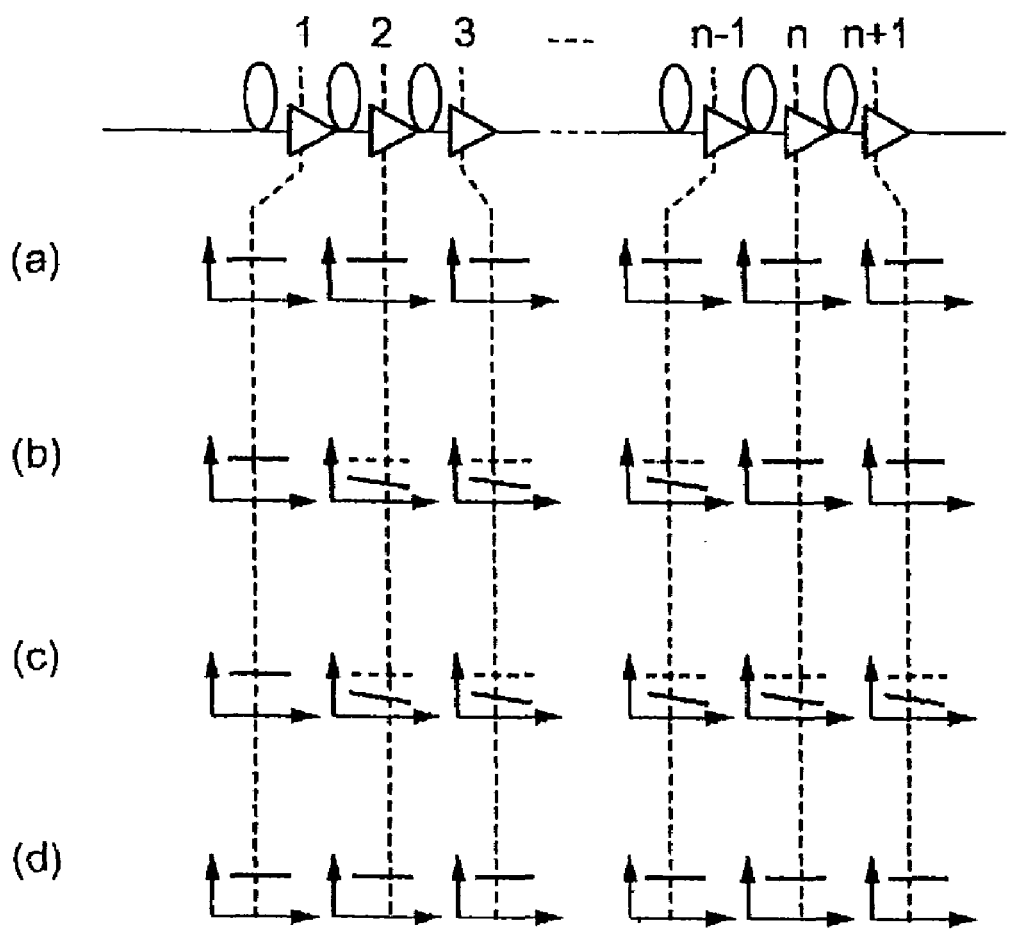

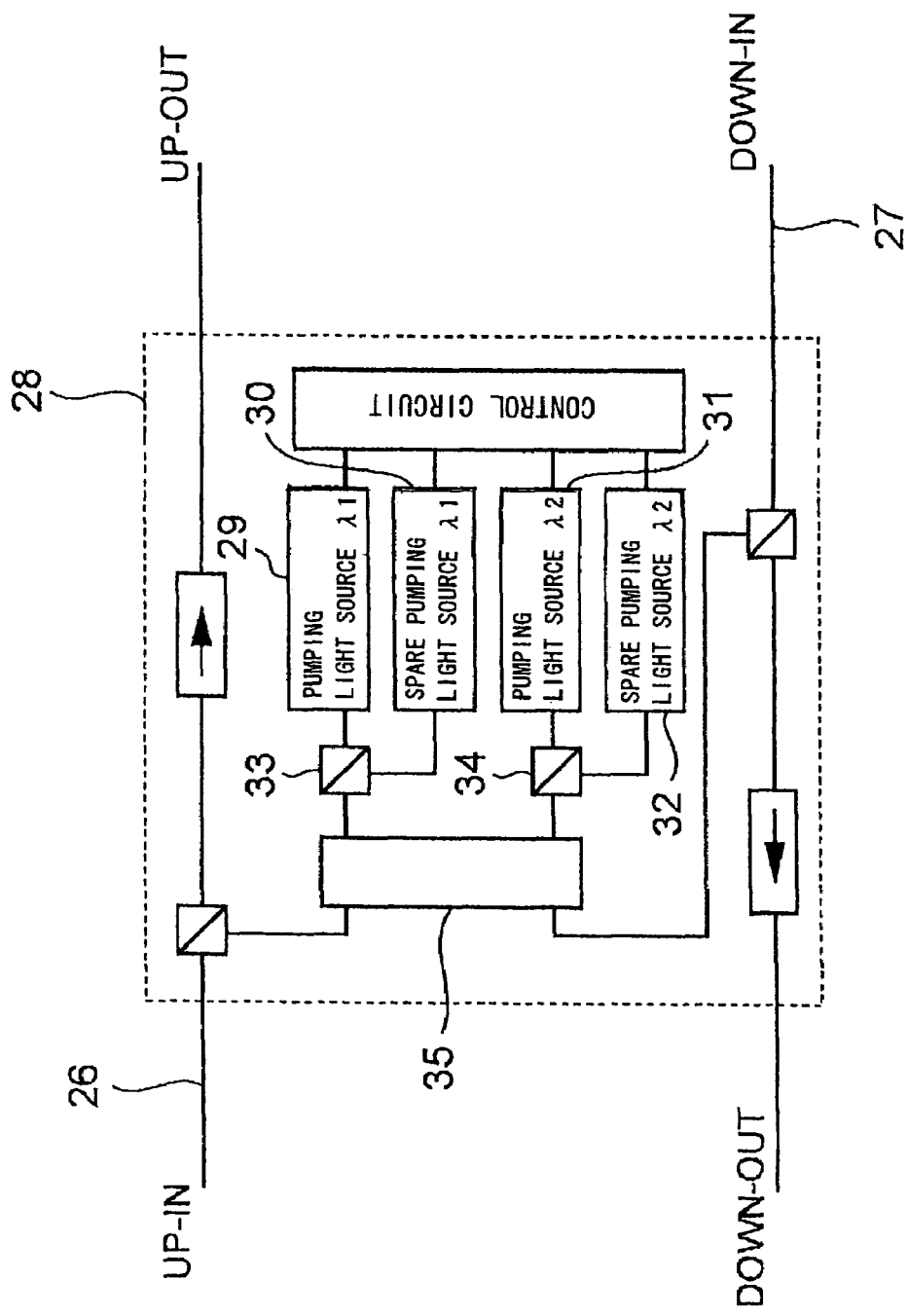

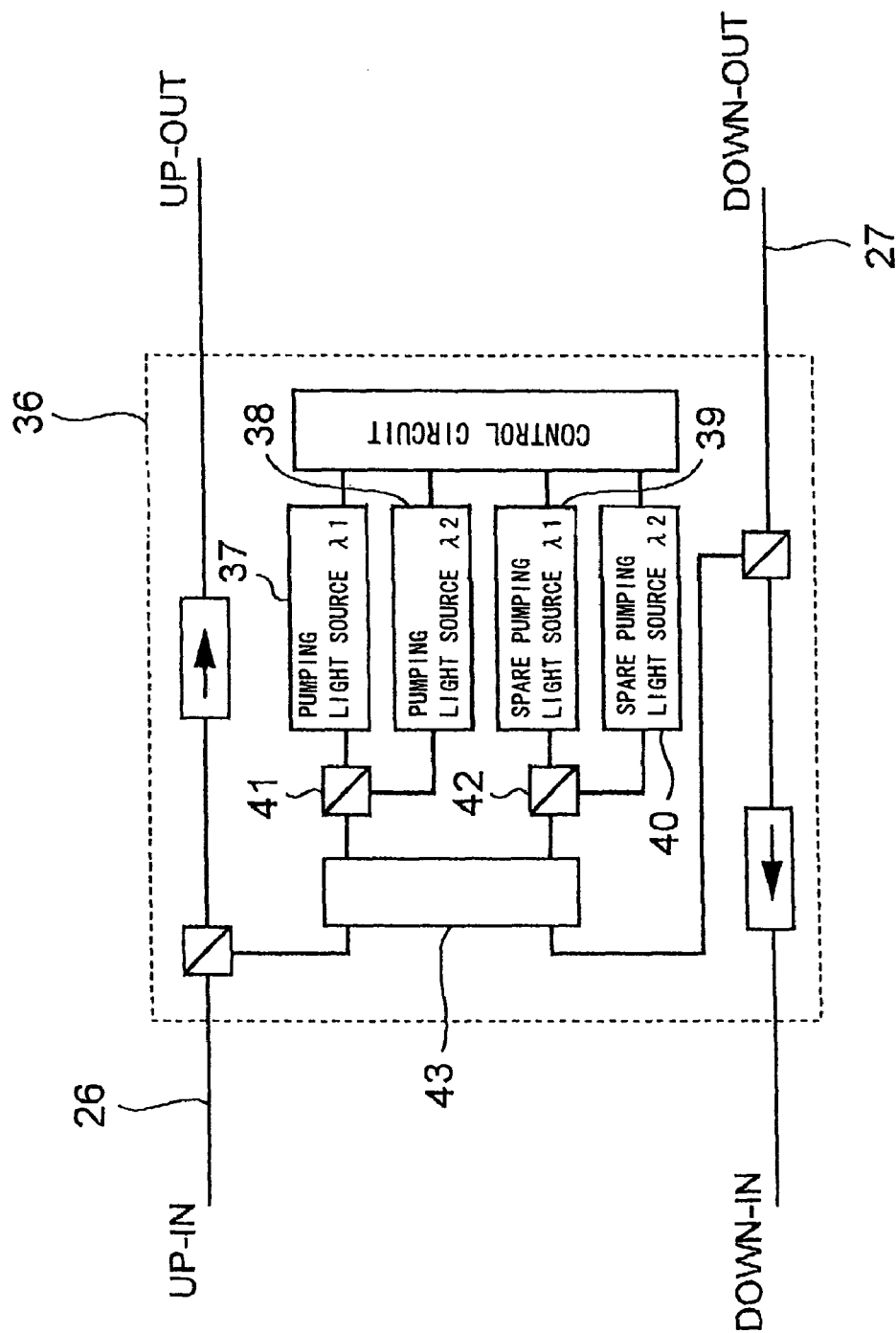

OPTICAL TRANSMISSION SYSTEM AND OPTICAL AMPLIFICATION METHOD USED IN THE SYSTEM

BACKGROUND OF THE INVENTION

The present invention relates to an optical transmission system and an optical amplification method used in the optical transmission system, in particular, in which the Raman amplification technology for amplifying signal light is used.

DESCRIPTION OF THE RELATED ART

In optical transmission technology, Raman amplification technology, in which Raman scattering is generated in an optical transmission line by using the optical transmission line as its own amplification medium and signal light is directly amplified, is well known. In Raman amplification technology, the Raman amplification phenomenon, in which a gain having a peak is generated at about 100 nm long wavelength side from the wavelength of a pumping light source, is used. In this Raman amplification technology, a gain wavelength is decided by the wavelength of the pumping light source. Therefore, in the optical signal transmission system using the wavelength division multiplexing (WDM) system, a design method, which keeps the signal light in a flat state by combining pumping light sources of plural wavelengths, has been generally used. This technology has been reported at the 2001 Communications Society Conference B-10-66 of The Institute of Electronics, Information and Communication Engineers. Consequently, when a pumping light source has a failure, it is necessary to have a means to compensate for the change of the gain wavelength characteristic.

In Raman amplification technology, the gain is decided by the pumping intensity, and the self healing phenomenon in which the gain is recovered after several repeats at amplifiers using an erbium doped fiber (EDF), is not generated. In order to solve this problem, there are several methods. In one method, a pumping light source for redundancy is provided in each of the light sources for Raman amplification. In another method, the pumping light intensity is compensated for by allocating the pumping light intensity to the several light sources for Raman amplification disposed after the pumping light source of a light source for Raman amplification has a failure. These methods have been reported in the 2001 Communications Society Conference B-10-62 of The Institute of Electronics, Information and Communication Engineers.

However, in the event that a pumping light source for redundancy is provided in all of the light sources for Raman amplification, there is a problem in that the cost of the optical transmission system is increased. In the event that a pumping light source has a failure, when the pumping light intensity is compensated for by the plural light sources for Raman amplification disposed after the light source that has a failure, there is a problem in that each of the pumping light sources must have excess pumping light intensity, an ability that is not used in the normal state.

SUMMARY OF THE INVENTION

It is therefore an object of the present invention to provide an optical transmission system and an optical amplification method using in the system, in which the number of pumping light sources for redundancy is decreased and the maximum output level ability of each of pumping light sources is made to be low.

According to a first aspect of the present invention, for achieving the object mentioned above, there is provided an optical transmission system. The optical transmission system provides one or more first light sources for Raman amplification that amplify signal light transmitting in an optical transmission line, and one or more second light sources for Raman amplification that are disposed at the positions adjoining the one or more first light sources for Raman amplification via the optical transmission line. And each of the one or more first light sources for Raman amplification provides a first pumping light source that emits first pumping light at a normal time as a pumping light source, and a first optical multiplexer that inputs the first pumping light to the optical transmission line. And each of the one or more second light sources for Raman amplification provides a second pumping light source that emits second pumping light of the same wavelength band of the first pumping light at a normal time as a pumping light source, a spare pumping light source that emits spare pumping light of the same wavelength band of the first pumping light based on necessity, an optical coupler that couples the second pumping light and the spare pumping light, and a second optical multiplexer that inputs the coupled pumping light to the optical transmission line. And in case that a failure occurred at the first or second pumping light source, the spare pumping light source is worked and the spare pumping light is emitted.

According to a second aspect of the present invention, there is provided an optical transmission system. The optical transmission system provides one or more first light sources for Raman amplification that amplify signal light transmitting in an optical transmission line, and one or more second light sources for Raman amplification that are disposed at the positions adjoining the one or more first light sources for Raman amplification via the optical transmission line. And each of the one or more first light sources for Raman amplification provides plural first pumping light sources that emit plural first pumping light whose wavelengths are different from each other at a normal time, as pumping light sources, a first optical multiplexer that multiplexes the plural first pumping light, and a second optical multiplexer that inputs the multiplxed first pumping light to the optical transmission line. And each of the one or more second light sources for Raman amplification provides plural second pumping light sources that emit plural second pumping light whose wavelengths are the same ones corresponding to the plural first pumping light sources at a normal time, as pumping light sources, plural spare pumping light sources that emit plural spare pumping light whose wavelengths are the same ones corresponding to the plural second pumping light sources based on necessity, plural optical couplers that couple the second pumping light and the spare pumping light of the same wavelength band, a third optical multiplexer that multiplexes plural coupled pumping light whose wavelengths are different from each other, and a fourth optical multiplexer that inputs multiplexed pumping light to the optical transmission line. And in case that a failure occurred at one in the plural first or plural second pumping light sources, the spare pumping light source whose wavelength band is the same one that the failure occurred is worked and the spare pumping light is emitted.

According to a third aspect of the present invention, in the first aspect, in case that a failure occurred at the first or second pumping light source, the spare pumping light is emitted from the spare pumping light source so that the output level of the signal light becomes the same output level before the failure occurred.

According to a fourth aspect of the present invention, in the second aspect, in case that a failure occurred at one in the plural first or plural second pumping light sources, the spare pumping light is emitted from corresponding one of the plural spare pumping light sources so that the output level of the signal light becomes the same output level before the failure occurred.

According to a fifth aspect of the present invention, in the first aspect, in case that a failure occurred at the first or second pumping light source, the spare pumping light is emitted from the spare pumping light source so that the gain wavelength characteristic of the signal light becomes the same gain wavelength characteristic before the failure occurred.

According to a sixth aspect of the present invention, in the second aspect, in case that a failure occurred at one in the plural first or plural second pumping light sources, the spare pumping light is emitted from corresponding one of the plural spare pumping light sources so that the gain wavelength characteristic of the signal light becomes the same gain wavelength characteristic before the failure occurred.

According to a seventh aspect of the present invention, in the first aspect, each of the one or more first light sources for Raman amplification further provides a control circuit that controls the first pumping light source. And each of the one or more second light sources for Raman amplification further provides a control circuit that controls the second pumping light source and the spare pumping light source.

According to an eighth aspect of the present invention, in the second aspect, each of the one or more first light sources for Raman amplification further provides a control circuit that controls the plural first pumping light sources. And each of the one or more second light sources for Raman amplification further provides a control circuit that controls the plural second pumping light sources and the plural spare pumping light sources.

According to a ninth aspect of the present invention, there is provided an optical transmission system. The optical transmission system provides one or more light sources for Raman amplification not having a redundancy system that amplify signal light transmitting in plural optical transmission lines, and one or more light sources for Raman amplification having a redundancy system that are disposed at the positions adjoining the one or more light sources for Raman amplification not having the redundancy system via the plural optical transmission lines. And each of the one or more light sources for Raman amplification not having the redundancy system provides plural first pumping light sources that emit first pumping light whose wavelengths are different from each other at a normal time, as pumping light sources, a first means that multiplexes the plural first pumping light and splits multiplexed pumping light into plural pumping light, and plural first optical multiplexers that input split pumping light to the plural optical transmission lines. And each of the one or more light sources for Raman amplification having the redundancy system provides plural second pumping light sources that emit second pumping light whose wavelengths are the same ones of the plural first pumping light sources at a normal time, as pumping light sources, plural spare pumping light sources that emit spare pumping light whose wavelength bands are the same ones corresponding to the plural first pumping light sources, based on necessity, plural optical couplers that couple the second pumping light and the spare pumping light of the same wavelength band, a second means that multiplexes plural coupled pumping light whose wavelengths are different from each other and splits mulitplexed pumping light into plural pumping light, and plural second optical multiplexers that input split pumping light to the plural optical transmission lines. And in case that a failure occurred at one in the plural first pumping light sources in the one or more light sources for Raman amplification not having the redundancy system or at one in the plural second pumping light sources in the light sources for Raman amplification having the redundancy system, the spare pumping light source whose wavelength band is the same one that the failure occurred is worked and the spare pumping light is emitted.

According to a tenth aspect of the present invention, there is provided an optical transmission system. The optical transmission system provides one or more light sources for Raman amplification not having a redundancy system that amplify signal light transmitting in plural optical transmission lines, and one or more light sources for Raman amplification having a redundancy system that are disposed at the positions adjoining the one or more light sources for Raman amplification not having the redundancy system via the plural optical transmission lines. And each of the one or more light sources for Raman amplification not having the redundancy system provides plural first pumping light sources that emit first pumping light whose wavelengths are different from each other at a normal time, as pumping light sources, a first means that multiplexes the plural first pumping light and splits multiplexed pumping light into plural pumping light, and plural first optical multiplexers that input split pumping light to the plural optical transmission lines. And each of the one or more light sources for Raman amplification having the redundancy system provides plural second pumping light sources that emit second pumping light whose wavelengths are the same ones of the plural first pumping light sources at a normal time, as pumping light sources, plural spare pumping light sources that emit spare pumping light whose wavelength bands are the same ones corresponding to the plural first pumping light sources, based on necessity, plural optical multiplexers that multiplex the second pumping light having different wavelengths in one of the plural optical multiplexers and multiplex the spare pumping light having different wavelengths in other of the plural optical multiplexers, a second means that multiplexes plural multiplexed pumping light whose wavelengths are different from each other and splits mulitplexed pumping light into plural pumping light, and plural second optical multiplexers that input split pumping light to the plural optical transmission lines. And in case that a failure occurred at one in the plural first pumping light sources in the one or more light sources for Raman amplification not having the redundancy system or at one in the plural second pumping light sources in the light sources for Raman amplification having the redundancy system, the spare pumping light source whose wavelength band is the same one that the failure occurred is worked and the spare pumping light is emitted.

According to an eleventh aspect of the present invention, for achieving the object mentioned above, there is provided an optical amplification method in an optical transmission system, in which one or more first light sources for Raman amplification that amplify signal light transmitting in an optical transmission line and one or more second light sources for Raman amplification that are disposed at the positions adjoining the one or more first light sources for Raman amplification via the optical transmission line are provided. The optical amplification method provides the steps of, amplifying the signal light by the one or more first and second light sources for Raman amplification, transmitting the signal light in a deteriorated state of the characteristic of the signal light by that a failure occurred at one of the pumping light sources in the one or more first and second light sources for Raman amplification, detecting the deterioration state of the characteristic of the signal light by one of the second light sources for Raman amplification, and recovering the deteriorated state of the characteristic of the signal light to a normal state before deteriorated by emitting spare pumping light from a spare pumping light source disposed in one of the second light sources for Raman amplification.

According to a twelfth aspect of the present invention, in the eleventh aspect, in case that a failure occurred at one of the pumping light sources, the spare pumping light is emitted from the spare pumping light source so that the output level of the signal light becomes the same output level before the failure occurred.

According to a thirteenth aspect of the present invention, in the eleventh aspect, in case that a failure occurred at one of the pumping light sources, the spare pumping light is emitted from the spare pumping light source so that the gain wavelength characteristic of the signal light becomes the same gain wavelength characteristic before the failure occurred.

According to a fourteenth aspect of the present invention, in the eleventh aspect, plural pumping light sources emitting plural pumping light of plural wavelengths are used as the pumping light source, and plural spare pumping light sources emitting plural spare pumping light of plural wavelengths corresponding to the plural pumping light sources are used as the spare pumping light source.

According to a fifteenth aspect of the present invention, in the eleventh aspect, outputs from the pumping light source and the spare pumping light source are controlled by respective control circuits in the one or more first and second light sources for Raman amplification.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a structure of an optical transmission system of a first embodiment of the present invention;

FIG. 2 is output level diagrams of transmitting signal light in various optical transmission systems;

FIG. 3 is diagrams showing signal light output wavelength characteristics in each span between the light sources for Raman amplification in the various optical transmission systems;

FIG. 6 is a block diagram showing a structure of a light source for Raman amplification used in an optical transmission system of a third embodiment of the present invention; and FIG. 7 is a block diagram showing a structure of a light source for Raman amplification used in an optical transmission system of a fourth embodiment of the present invention.

DESCRIPTION OF THE PREFERRED EMBODIMENTS

Figure 4:
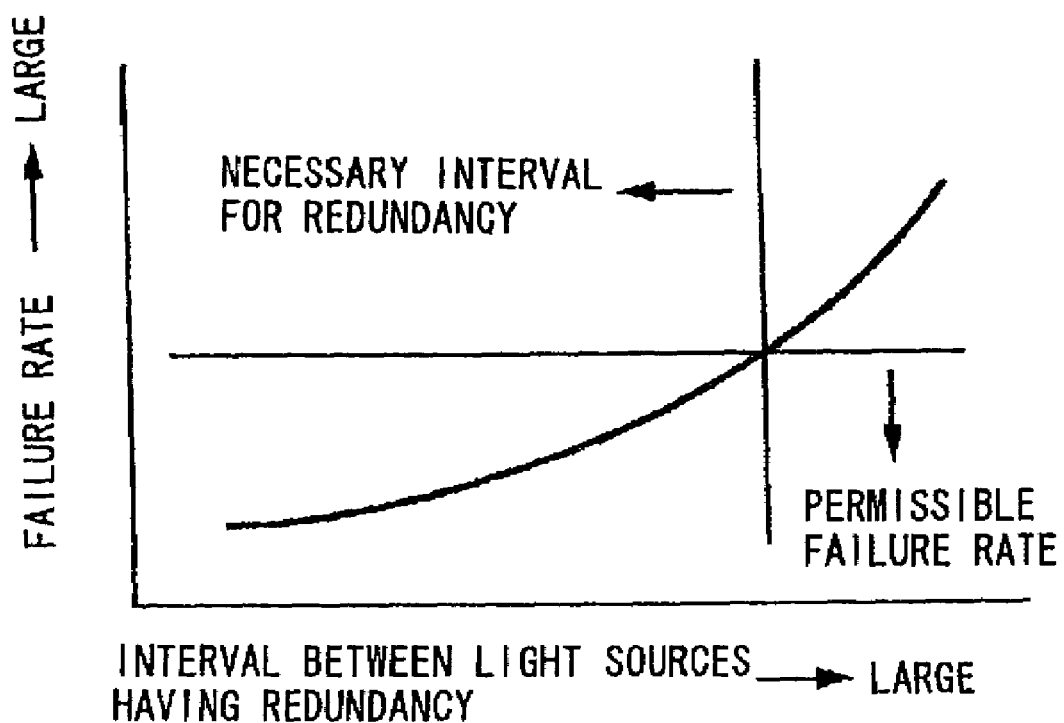
FIG. 4 is a graph showing the relation between the failure rate of the optical transmission system and the interval between the light sources for Raman amplification having the spare pumping light sources for redundancy of the first embodiment of the present invention.

Referring now to the drawings, embodiments of the present invention are explained in detail. First, a first embodiment of the present invention is explained. FIG. 1 is a block diagram showing a structure of an optical transmission system of the first embodiment of the present invention. In the first embodiment of the present invention, two pumping light sources whose wavelengths are different from each other are used.

As shown in FIG. 1, a light source for Raman amplification $1_1$ includes a pumping light source 3 for emitting pumping light having wavelength $\lambda 1$, a pumping light source 4 for emitting pumping light having wavelength $\lambda 2$, an optical multiplexer 7 that multiplexes the emitted pumping light having wavelengths of $\lambda 1$ and $\lambda 2$, an optical multiplexer 8 that inputs the multiplexed pumping light to an optical transmission line 2, a control circuit 5 for controlling the pumping light sources 3 and 4, and an optical isolator 6.

In this embodiment, each of the light sources for Raman amplification $1_2$ to $1_{n-1}$ has the same structure as the light source for Raman amplification $1_1$ has. Each of these light sources for Raman amplification $1_1$ to $1_{n-1}$ does not have spare pumping light sources for redundancy. In this description, "n" is an integer equal to two or more. However, an "n"th light source for Raman amplification $1_n$ has spare pumping light sources 11 and 12 for redundancy. The spare pumping light source 11 is provided for redundancy to a pumping light source 9 and the spare pumping light source 12 is provided for redundancy to a pumping light source 10. An optical coupler 17 couples the pumping light from the pumping light source 9 and the spare pumping light source 11. An optical coupler 18 couples the pumping light from the pumping light source 10 and the spare pumping light source 12. For the optical couplers 17 and 18, polarized wave couplers are used.

In the light source for Raman amplification $1_n$, the pumping light source 9 emits the pumping light of the same wavelength as the pumping light source 3 emits, and the pumping light source 10 emits the pumping light of the same wavelength as the pumping light source 4 emits. In addition, the spare pumping light source 11 emits the pumping light of the same wavelength as the pumping light source 3 emits, and the spare pumping light source 12 emits the pumping light of the same wavelength as the pumping light source 4 emits.

In the light source for Raman amplification $1_n$, the pumping light sources 9 and 10, and the spare pumping light sources 11 and 12 are controlled by a control circuit 13. Feedback is applied to these pumping light sources 9 and 10 and the spare pumping light sources 11 and 12 corresponding to the characteristics of signal light detected by a monitor (not shown) disposed at the optical transmission line 2. The spare pumping light sources 11 and 12 do not work during the normal operation of the pumping light sources and when any failure is not detected in the signal light. However, when the deterioration of the signal light is detected, caused by generating an abnormal state such as lowering the output power in any of the pumping light sources, the spare pumping light sources 11 and/or 12 is worked by the control circuit 13.

In the light source for Raman amplification $1_n$, an optical multiplexer 15 multiplexes the pumping light outputted from the optical couplers 17 and 18, and an optical multiplexer 16 inputs the pumping light multiplexed at the optical multiplexers 15 to the optical transmission line 2. In addition, an optical isolator 14 is provided in the light source for Raman amplification $1_n$.

Next, operation of the first embodiment of the present invention is explained. For example, in case a failure occurs at the pumping light source 4 in the first light source for Raman amplification $1_1$, signal light is transmitted from the first light source for Raman amplification $1_1$ onward in a state that the signal light output level and its wavelength characteristic are deteriorated. However, by making the spare pumping light source 12 in the "n"th light source for Raman amplification $1_n$ work, the deterioration caused by the pumping light source 4 is compensated, and the normal signal light output level and the normal wavelength characteristic can be recovered.

Referring to FIGS. 2 and 3, this operation is explained in more detail. FIG. 2 shows output level diagrams of transmitting signal light in various optical transmission systems. In FIG. 2, a continuous line shows an actual output level and a dotted line shows a normal output level, and plural light sources for Raman amplification 1 to n+1 are shown. FIG. 3 depicts diagrams showing signal light output wavelength characteristics in each span between the light sources for Raman amplification 1 to n+1 in various optical transmission systems. In FIG. 3, a horizontal line shows a normal signal light output wavelength characteristic and a slanted line shows a changed signal light output wavelength characteristic.

In FIGS. 2 and 3, (a) shows a case in which the pumping light sources in all the light sources for Raman amplification in an optical transmission system are working in a designated normal output level. FIGS. 2 (b) and 3 (b) show the optical transmission system of the present invention in which spare pumping light sources are disposed in the "n"th light source for Raman amplification, FIGS. 2(c) and 3(c) show an optical transmission system, in which spare pumping light sources are not provided, and FIGS. 2(d) and 3(d) show an optical transmission system, in which spare pumping light sources are provided in all the light sources for Raman amplification.

FIGS. 2 (b), (c), and (d) and 3 (b), (c), and (d) show cases in which a failure occurred in a pumping light source in the second light source for Raman amplification being the second repeater.

In FIGS. 2 (b) and 3 (b) of the present invention, a case, in which a pumping light source of wavelength λ2 in the second light source for Raman amplification had a failure, is explained. In this case, signal light is transmitted from the second light source for Raman amplification onward in a state that the signal light output level and its wavelength characteristic are deteriorated. However, by making a spare pumping light source of the same wavelength λ2 in the "n"th light source for Raman amplification work, the deterioration caused by the pumping light source in the second light source for Raman amplification is compensated, and the normal signal light output level and the normal wavelength characteristic can be recovered.

In FIGS. 2 (c) and 3 (c), since the optical transmission system does not provide any spare pumping light sources, as shown in FIGS. 2 (c) and 3 (c), from the second light source for Raman amplification onward, the signal light output level and its wavelength characteristic remain in the deteriorated levels.

In FIGS. 2 (d) and 3 (d), since the spare pumping light sources are provided in the second light source for Raman amplification in which a failure occurred, as shown in FIGS. 2 (d) and 3 (d), the signal light output level and its wavelength characteristic are not changed in all the light sources for Raman amplification.

When the cases shown in FIGS. 2 (b) and (d) and 3 (b) and (d) are compared, although the signal light output level and the wavelength characteristic, which are obtained finally, are the same, the necessary number of the spare pumping light sources is different. That is, the number of the spare pumping light sources in the present invention in the case shown in FIGS. 2 (b) and 3 (b) can be 1/n of that of the case shown in FIGS. 2 (d) and 3 (d) of the conventional technology. As mentioned above, the present invention is especially effective in an optical transmission system, in which the light sources for Raman amplification combining plural pumping wavelengths are used for realizing particularly flat gain wavelength characteristics.

In the present invention, a case, in which two wavelengths are used for the pumping light sources, is explained. However, the number of the wavelengths is not limited to two, and three or more wavelengths can be used, and the deterioration occurring in the signal light can be recovered to a normal state, by the operation like that mentioned above.

In an optical transmission system not providing any spare pumping light source, when one or more pumping light sources had failures, it is said that the optical transmission system had a failure.

Next, equations for calculating a failure rate of the optical transmission system of the present invention are explained.

For the calculation of the failure rate, an optical transmission system composed of a total of N light sources for Raman amplification, in which spare pumping light sources for redundancy are provided in the light sources for Raman amplification every "n" repeats, is considered. The failure rate of a pumping light source is defined as $F1r$, and the failure rate of a spare pumping light source for redundancy is defined as $F2r$. In this description, N is an integer equal to or larger than "n".

In a case where the spare pumping light sources are provided every "n"th light source for Raman amplification, the failure rate of the total light sources for Raman amplification is the sum of probability "a" and probability "b". The probability "a" is the probability that pumping light sources in two or more light sources for Raman amplification in the "n" light sources for Raman amplification have failures. The probability "b" is the probability that a pumping light source in one light source for Raman amplification in the "n" light sources for Raman amplification has a failure, and also a spare pumping light source has a failure. The probability "a" is shown in the following equation (1) and the probability "b" is shown in the following equation (2).

$$a = nC2 \times F1r^2 + nC3 \times F1r^3 + \ldots + nCn-1 \times F1r^{(n-1)} + nCn \times F1r^n \tag{1}$$

$$b = nC1 \times F1r \times F2r \tag{2}$$

In the above equations, nCx represents the number of combinations that extract x pieces from n pieces given by the following equation, and the order of the extraction is free.

$$nCx = n!/x!(n-x)!$$

A value being the sum of the probability (a) and (b) multiplied by N/n becomes the failure rate of the optical transmission system in the case that the spare pumping light sources are provided every "n" th repeater (light source for Raman amplification) in the optical transmission system composed of a total of N repeaters (light sources for Raman amplification). That is, the failure rate Fs of the optical transmission system is given by the following equation (3).

$$Fs = N/n \times (a+b) \tag{3}$$

FIG. 4 is a graph showing the relation between the failure rate of the optical transmission system and the interval between the light sources for Raman amplification having the spare pumping light sources for redundancy of the first embodiment of the present invention. As shown in FIG. 4, the necessary interval between the light sources for Raman amplification having the spare pumping light sources for redundancy can be decided by the permissible failure rate of the optical transmission system.

Figure 5:
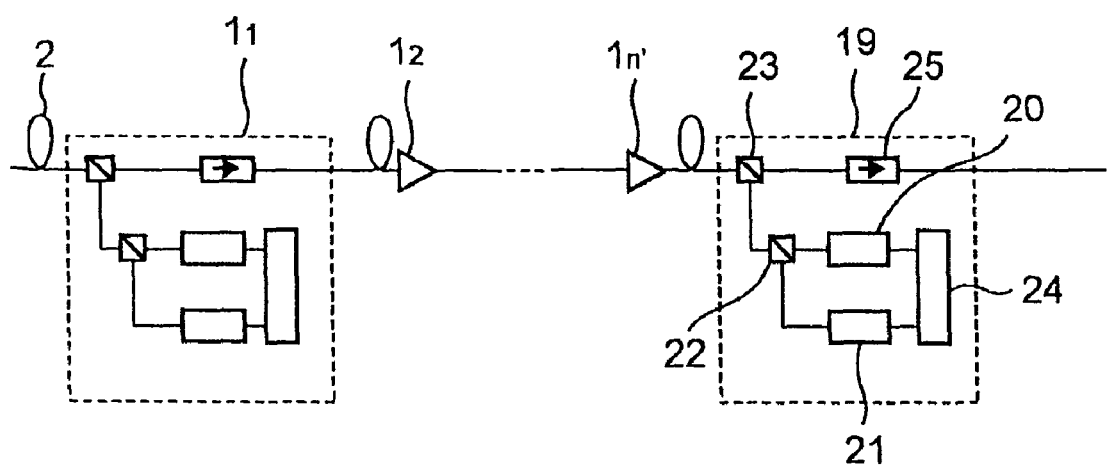
FIG. 5 is a block diagram showing a structure of an optical transmission system of a second embodiment of the present invention.

Next, a second embodiment of the present invention is explained. FIG. 5 is a block diagram showing a structure of an optical transmission system of the second embodiment of the present invention. In the second embodiment of the present invention, the structures of the light sources for Raman amplification $1_1$ to $1_{n-1}$ (not shown) are the same ones as in the first embodiment. Further, the structure of the light source for Raman amplification $1_{n'}$ is the same as that of the light source for Raman amplification $1_1$ and is different from that of the light source for Raman amplification $1_n$ of the first embodiment. That is, for the second embodiment, a light source for Raman amplification 19 specialized only for redundancy is provided additionally. As shown in FIG. 5, the light source for Raman amplification 19 consists of spare pumping light sources 20 and 21 for redundancy, an optical multiplexer 22 that multiplexes the pumping light emitted from the spare pumping light sources 20 and 21, an optical multiplexer 23 that inputs the multiplexed pumping light to an optical transmission line 2, a control circuit 24 for controlling the spare pumping light sources 20 and 21, and an optical isolator 25.

In the second embodiment of the present invention, the same effect as the first embodiment can be obtained. In the second embodiment of the present invention, two wavelengths are used for the pumping light sources. However, the number of the wavelengths is not limited to two and three or more wavelengths can be used.

Next, a third embodiment of the present invention is explained. FIG. 6 is a block diagram showing a structure of a light source for Raman amplification used in an optical transmission system of the third embodiment of the present invention. In the third embodiment of the present invention, a light source for Raman amplification applying to upstream and downstream optical transmission lines is explained.

In FIG. 6, a light source for Raman amplification 28 being common for an upstream optical transmission line 26 and a downstream optical transmission line 27 is provided in the third embodiment of the present invention.

As shown in FIG. 6, the light source for Raman amplification 28 having redundancy provides a pumping light source 29 for emitting pumping light having wavelength $\lambda 1$, a spare pumping light source 30 for emitting pumping light having wavelength $\lambda 1$, a pumping light source 31 for emitting pumping light having wavelength $\lambda 2$, a spare pumping light source 32 for emitting pumping light having wavelength $\lambda 2$, an optical coupler 33 that couples the pumping light of wavelength $\lambda 1$ emitted from the pumping light source 29 and the spare pumping light source 30, an optical coupler 34 that couples the pumping light of wavelength $\lambda 2$ emitted from the pumping light source 31 and the spare pumping light source 32, and an optical multiplexer 35 that multiplexes the pumping light of wavelengths $\lambda 1$ and $\lambda 2$ and splits the multiplexed pumping light. The split pumping light is inputted to the upstream and downstream optical transmission lines 26 and 27 respectively via respective optical multiplexers. In FIG. 6, a control circuit and optical isolators are also shown. By using the light source for Raman amplification 28 at the "n"th position in the upstream and downstream optical transmission lines, the same effect as the first embodiment can be obtained in the third embodiment of the present invention. In this embodiment, for each of the first to "n-1"th positions, alight source for Raman amplification, in which the spare pumping light sources 30 and 31 are not provided in the light sources for Raman amplification is used.

Next, a fourth embodiment of the present invention is explained. FIG. 7 is a block diagram showing a structure of a light source for Raman amplification used in an optical transmission system of the fourth embodiment of the present invention. In the fourth embodiment of the present invention, a light source for Raman amplification applying to upstream and downstream optical transmission lines is the same as in the third embodiment of the present invention.

In FIG. 7, a light source for Raman amplification 36 being common for an upstream optical transmission line 26 and a downstream optical transmission line 27 is provided in the fourth embodiment of the present invention.

As shown in FIG. 7, the light source for Raman amplification 36 having redundancy provides a pumping light source 37 for emitting pumping light having wavelength $\lambda 1$, a pumping light source 38 for emitting pumping light having wavelength $\lambda 2$, a spare pumping light source 39 for emitting pumping light having wavelength $\lambda 1$, a spare pumping light source 40 for emitting pumping light having wavelength $\lambda 2$, an optical multiplexer 41 that multiplexes the pumping light of wavelengths $\lambda 1$ and $\lambda 2$ emitted from the pumping light sources 37 and 38, an optical multiplexer 42 that multiplexes the pumping light of wavelengths $\lambda 1$ and $\lambda 2$ emitted from the spare pumping light sources 39 and 40, an optical multiplexer 43 that multiplexes the pumping light from the optical multiplexers 41 and 42 and splits the multiplexed pumping light. The split pumping light is inputted to the upstream optical transmission line 26 and the downstream optical transmission line 27 respectively via respective optical multiplexers. In FIG. 7, a control circuit and optical isolators are also shown. By using the light source for Raman amplification 36 at the "n"th position in the upstream and downstream optical transmission lines, the same effect as the first embodiment can be obtained in the fourth embodiment of the present invention. In this embodiment, for each of the first to "n-1"th positions, alight sources for Raman amplification, in which the spare pumping light sources 39 and 40 are not provided in the light source for Raman amplification, is used.

As mentioned above, according to the optical transmission system of the embodiments of the present invention, a redundant system (spare pumping light sources) is not provided in each of the light sources for Raman amplification, but one redundant system is provided in one of the plural light sources for Raman amplification. Therefore, the number of components in the optical transmission system can be decreased, and also the cost of manufacturing the optical transmission system can be decreased. Moreover, by the structure mentioned above, even when a failure occurs in a pumping light source, the signal light can be kept at a desirable output level and a desirable wavelength characteristic.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical amplification method for an optical transmission system including a plurality of first light sources for Raman amplification that amplify signal light transmitted in an optical transmission line and a plurality of second light sources for Raman amplification that are disposed at positions adjoining respective members of said plurality of first light sources for Raman amplification via said optical transmission line, comprising the steps of:

amplifying said signal light by said first light sources for Raman amplification;

transmitting said amplified signal light through said optical transmission line;

providing one or more spare pumping light sources only among said plurality of second light sources for Raman amplification, the number of said second light sources being less than the number of said first light sources, a number of said first light sources not having spare pumping light sources, interveningly positioned between two of said second light sources being determined by a permissible failure rate of the optical transmission system;

detecting a deteriorated state of said signal light amplified by one or more of said first sources for Raman amplification; and restoring said deteriorated signal light to an un-deteriorated state by emitting spare pumping light from at least one of said spare pumping light sources, said spare pumping light sources being operated only when required to restore deteriorated signal light.

2. An optical amplification method in an optical transmission system in accordance with claim 1, wherein:

responsive to a deteriorated state of said amplified signal light, said spare pumping light is emitted from said spare pumping light source so that the output level of said signal light becomes the same output level before said deterioration.

3. An optical amplification method in an optical transmission system in accordance with claim 1, wherein:

responsive to a deteriorated state of said amplified signal light, said spare pumping light is emitted from said spare pumping light source so that the gain wavelength characteristic of said signal light becomes the same gain wavelength characteristic before said deterioration.

4. An optical amplification method in an optical transmission system in accordance with claim 1, wherein:

said first and second light sources emit light at first and second wavelengths, and at least one spare pumping light source is provided for each of said first and second wavelengths.

5. An optical amplification method in an optical transmission system in accordance with claim 1, wherein:

outputs from said pumping light source and said spare pumping light source are controlled by respective control circuits in said one or more first and second light sources for Raman amplification.

6. An optical amplification method for an optical transmission system including a plurality of first light sources for Raman amplification for amplifying signal light transmitted in an optical transmission line and a plurality of second light sources for Raman amplification for amplifying signal light transmitted in said optical transmission line, wherein ones of said plurality of second light sources for Raman amplification are disposed at positions adjoining respective members of said first light sources for Raman amplification, said method comprising the steps of:

amplifying said signal light at first and second wavelengths by at least one of the plurality of said first Raman amplifiers;

transmitting, by the at least one of the plurality of said first Raman amplifiers, said amplified signal light through said optical transmission line;

providing, only among said plurality of second light sources for Raman amplification, a first spare pumping light source operating at a first wavelength for Raman amplification, and a second spare pumping light source operating at a said second wavelength for Raman amplification;

detecting a deteriorated state of said signal light in said optical transmission line at said first wavelength, and/or said second wavelength; and restoring said deteriorated signal light to an un-deteriorated state by operating said first or second spare pumping light sources, said first and second spare pumping light sources being operated only when required to restore deteriorated signal light at their respective operating wavelengths, a total number of said first light sources for Raman amplification and a total number of said second light sources for Raman amplification being determined by a permissible failure rate of the optical transmission system.

* * * * *